Jan. 5, 1926.

E. A. JOHNSTON ET AL

POWER DRIVEN IMPLEMENT

Filed May 3, 1920    9 Sheets-Sheet 1

1,568,163

Inventors:
Edward A. Johnston,
Bert R. Benjamin,
and Charles Pearson.
By Henry J. Savage
Atty.

Jan. 5, 1926.  1,568,163

E. A. JOHNSTON ET AL

POWER DRIVEN IMPLEMENT

Filed May 3, 1920   9 Sheets-Sheet 8

Inventors:
Edward A. Johnston,
Bert R. Benjamin,
and Charles Pearson.
By Henry J. Savage
Atty.

Jan. 5, 1926.

E. A. JOHNSTON ET AL

1,568,163

POWER DRIVEN IMPLEMENT

Filed May 3, 1920    9 Sheets-Sheet 9

Inventors.
Edward A. Johnston,
Bert R. Benjamin,
and Charles Pearson,
By Henry J. Savage
Atty.

Patented Jan. 5, 1926.

1,568,163

UNITED STATES PATENT OFFICE.

EDWARD A. JOHNSTON, OF CHICAGO, BERT R. BENJAMIN, OF OAK PARK, AND CHARLES PEARSON, OF CHICAGO, ILLINOIS, ASSIGNORS TO INTERNATIONAL HARVESTER COMPANY, A CORPORATION OF NEW JERSEY.

POWER-DRIVEN IMPLEMENT.

Application filed May 3, 1920. Serial No. 378,623.

*To all whom it may concern:*

Be it known that we, EDWARD A. JOHNSTON, BERT R. BENJAMIN, and CHARLES PEARSON, citizens of the United States, and residents, respectively, of Chicago, Ill., Oak Park, Ill., and Chicago, Ill., have invented new and useful Improvements in Power-Driven Implements, of which the following is a full, clear, and exact specification.

Our invention relates to motor propelled agricultural implements and has for an object to provide an implement that is not only power propelled but is also power driven.

Another object is to provide a combined tractor and implement in which a single power unit serves not only to propel the tractor and implement but also serves to steer the tractor and drive and adjust the implement.

Another object is to provide a combined tractor and implement all operations of which can be controlled by a single operator.

A further object is to provide a combined tractor and implement in which the implement is driven by power from the tractor but is separable therefrom, thereby adapting the tractor to use with a large variety of implements.

A still further object of our invention is to provide a motor propelled and power driven implement in which the operation of the implement is under the direct control and observation of the operator.

An additional object of our invention is to provide a power propelled, power steered, power driven and power adjusted mower having a plurality of independently driven cutter bars.

With the above and other objects in view reference will now be had to the accompanying drawings for a full disclosure of our invention wherein we have illustrated a motor propelled mower having a plurality of cutter bars and in which:

Fig. 1ª is a detailed sectional view of the steering control means housed in the casing 19 shown in Fig. 1.

Fig. 4 is an end view, looking from the right in Fig. 3 showing the mower and carrying pipe in lowered position.

Fig. 4ª is a detail end view of part of the mechanism shown in Fig. 3, and taken along line 4ª—4ª, looking in the direction of the arrows.

Fig. 6 is a sectional view of the transmission assembly between the engine shaft and tractor drive, taken approximately along line 6—6 of Fig. 1 and looking in the direction of the arrows.

Fig. 6ª is a detail end view of the gear shifting mechanism taken along line 6ª—6ª of Fig. 6, and looking in the direction of the arrows.

Fig. 12 is a view partly in section and partly in elevation showing the means for transmitting power from the engine crank shaft to the implement driving and lifting means.

Our invention may be briefly described as embodying a tractor particularly adapted to have detachably connected thereto any one of several agricultural implements such as mowers, binders, corn harvesters, harvester threshers, headers, and the like, that require power for driving the cutter bar or other mechanism, as well as implements such as plows, cultivators, rakes, and the like that do not require power drive of an operating mechanism. The tractor embodied in our invention is adapted to have the implement detachably carried by an adjustable supplemental frame in front of and in full view of the operator of the tractor. The tractor is provided with a single power unit, and independent transmission mechanisms under control of the single operator are provided for power propelling, power steering, power driving and power adjusting of the implement. Since all of these transmission mechanisms are independently operative it is possible when the power unit is in operation to perform any one of the above noted functions alone. This is particularly advantageous in going to and from fields when only propelling and steering of the implement are required, and in cutting a heavy stand of grain or hay when the cutter bars may be run at full speed with the implement travelling at low speed or even standing still. Likewise when operating in a poor stand of grain, the cutter bars may be operated at normal speed while the implement is being propelled at high speed. And still further when the mower attachment illustrated in the drawings is being used, either cutter bar may be operated with the other locked in inoperative position. It is to be noted that all of the functions of our invention are controlled by a single operator and that we have therefore provided an implement that will be economical in operation by doing away with one or more operators that have heretofore been required and by adapting a single propelling means for use with a wide variety of implements.

Figure 1:
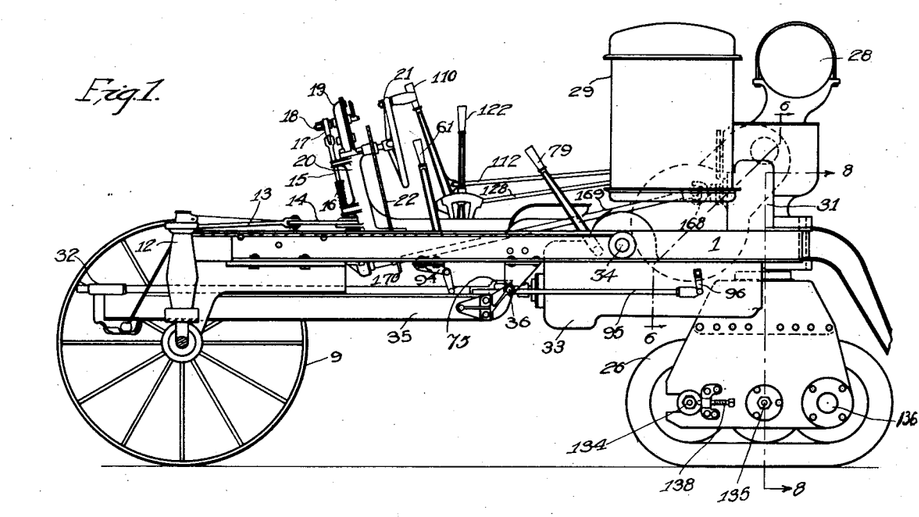
Fig. 1 is a side elevation of a tractor embodying part of our invention, the implement being omitted because of the small scale of the figure.
Figure 2:
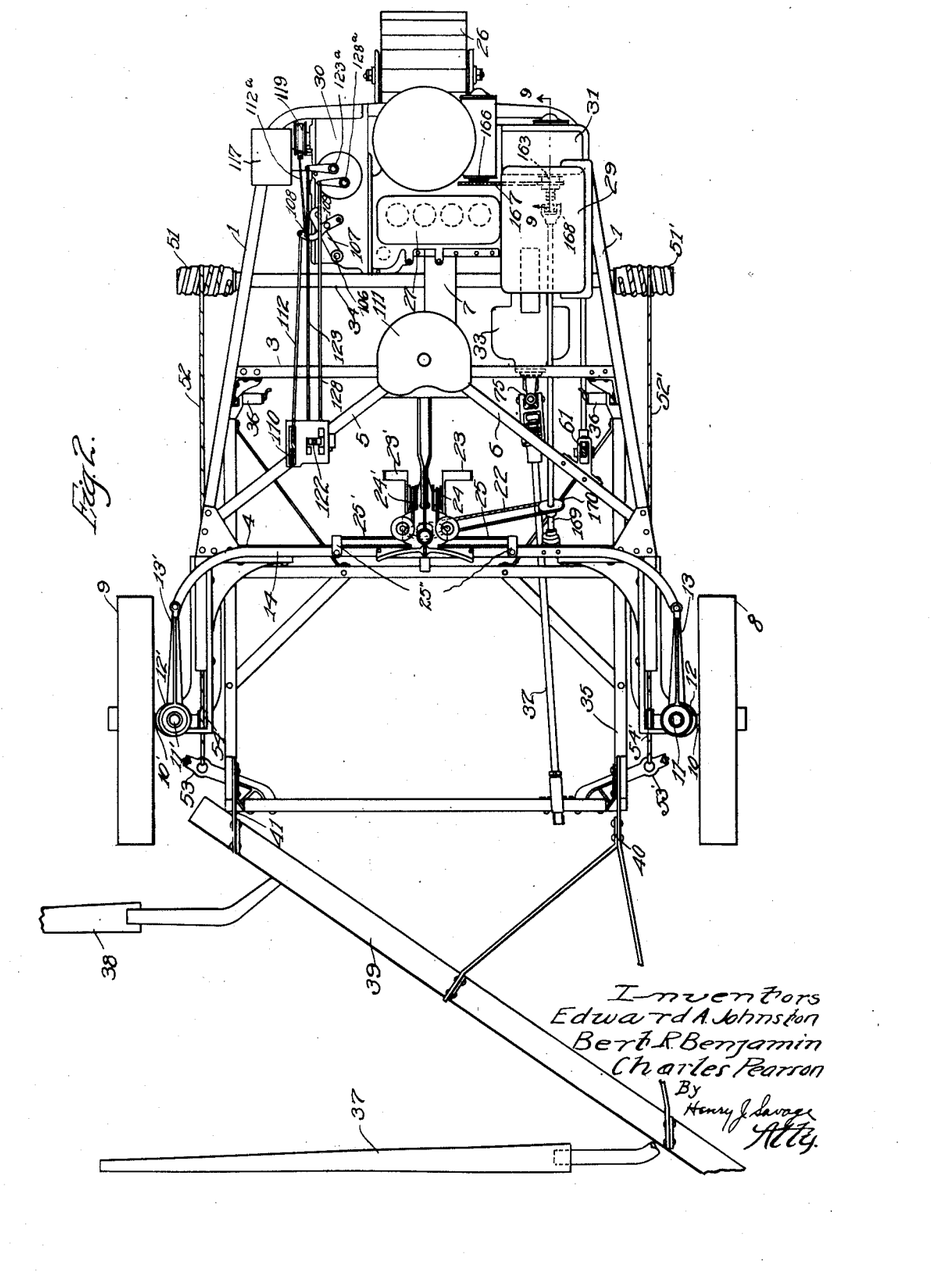
Fig. 2 is a plan view of our invention, the implement carried by the tractor being shown only diagrammatically and the hand steering wheel and post being omitted.

Referring to Figs. 1 and 2, the tractor or propelling unit of our invention comprises a main frame 1 preferably formed from light channels or other suitable structural shapes and stiffened by the cross members and tie rods 3, 4, 5, 6 and 7, secured to the main frame by gussets and angle braces as shown. The front side of the main frame is open and is supported by the wheels 8 and 9 mounted on horizontal axles 10—10' formed integral with vertical steering shafts 11—11' journaled in castings 12—12' secured to the front of the frame. Steering arms 13—13' secured to the upper ends of the vertical shafts are connected by a steering yoke 14 which is normally held in stationary or in operative position by a pin 15 engaging in a slot or hole in the yoke. The pin is held in engagement with the yoke by a spring 16 and is pivotally connected at its upper end to an arm 17 secured to a shaft 18 journaled in a housing 19 mounted on the steering post 20.

Figures 1A, 4, 4A:
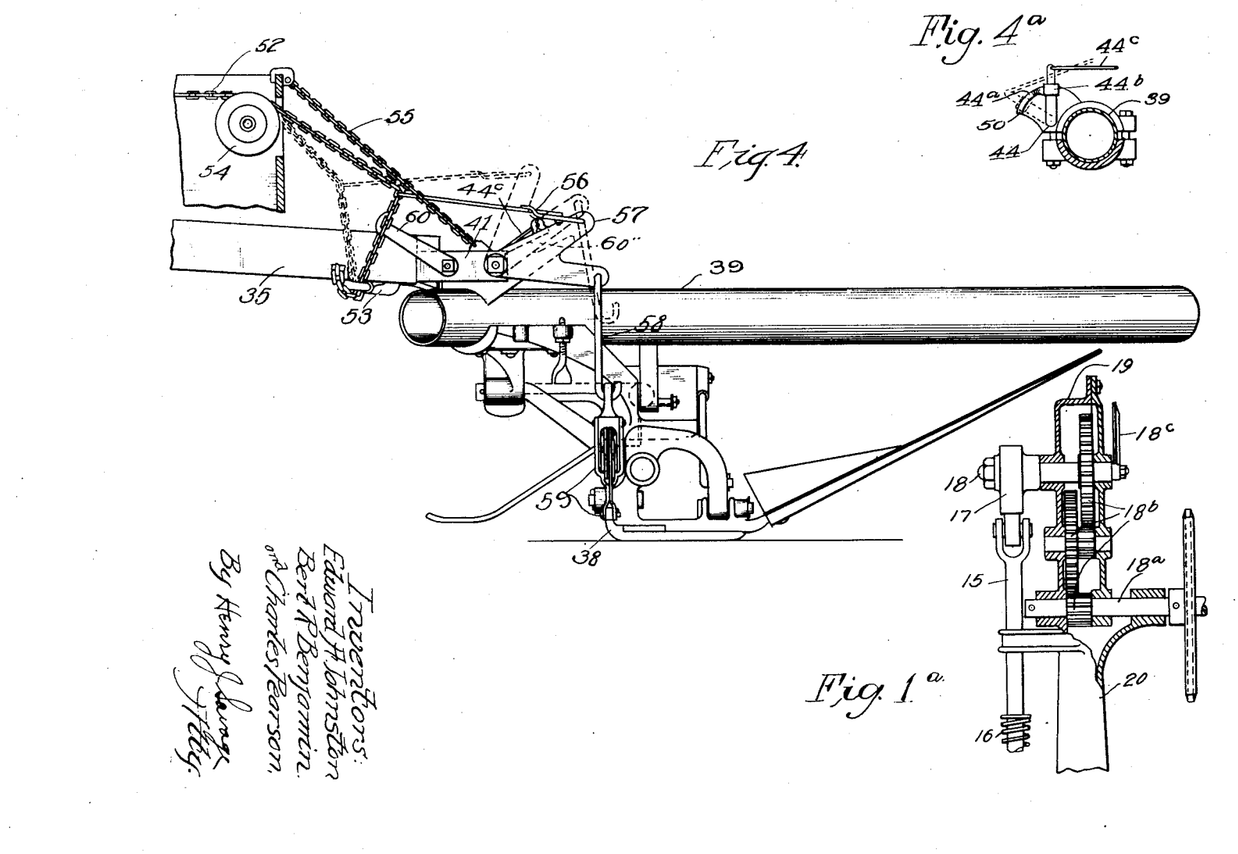

Journaled on the steering post is a hand wheel 21 having chain and sprocket connection 22 with the power steering mechanism to be described later. The hand wheel 21 is also connected to turn the shaft 18 and arm 17, through the medium of a shaft 18$^a$, and gear train 18$^b$ mounted in the housing 19. A suitable indicator 18$^c$ may be fixed to the outer end of shaft 18 to indicate its angle of rotation, as shown in Figs. 1 and 1$^a$. Thus, continued rotation of the hand wheel will raise the pin 15 against the tension of the spring and release the steering yoke 14.

Referring to Fig. 2, pedals 23, 23' are shown connected to sheaves 24, 24' pivotally mounted on the frame to each of which is secured one end of a chain or cable 25, 25', the other end of the cable being secured to ears or lugs 25'' on the yoke 14. The hand wheel 21 is omitted in this figure so as to show the pedals and cables clearly, the upper end of the chain 22 being shown in dotted lines so as to make its driving connection with the hand wheel clear. When the pin 15 is raised to release the yoke, the front wheels are free to castor on the vertical shafts 11, 11' or they may be controlled through the pedals 23, 23' to effect a quick turning of the implement in conjunction with the power steering means to be described later.

Figures 7, 8:
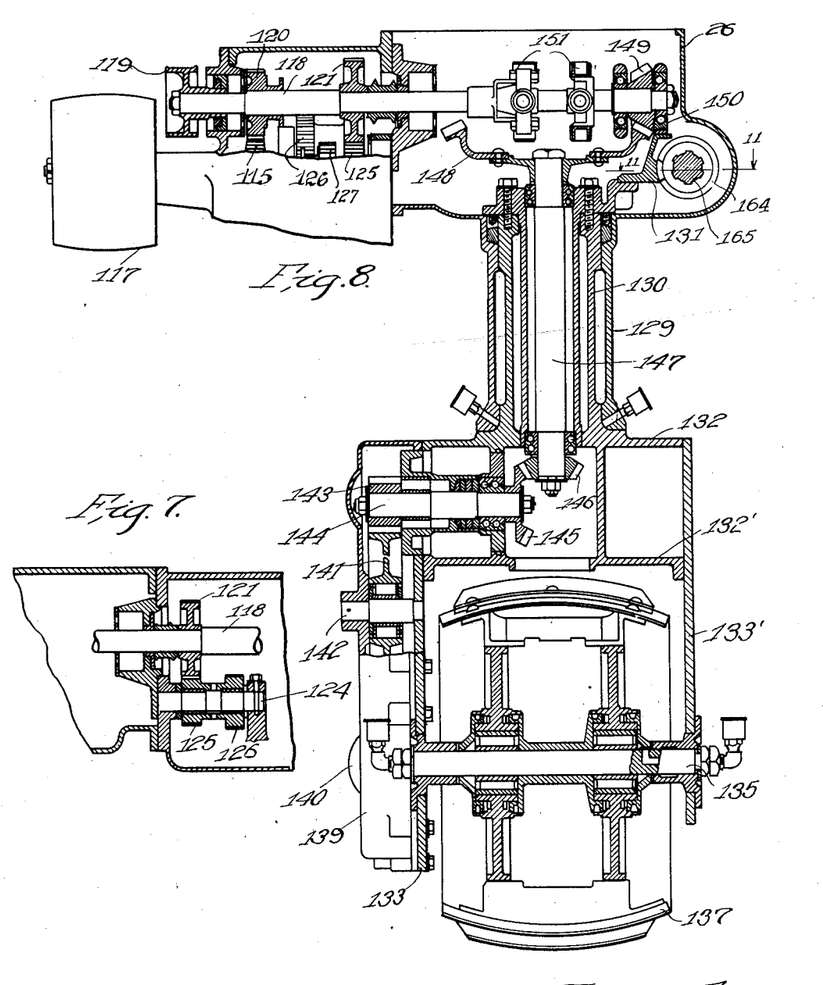
Fig. 7 shows a detail of the transmission assembly of Fig. 6, looking from the opposite side.
Fig. 8 is a vertical sectional view of the tractor driving and steering means taken on the line 8—8 Fig. 1.

The rear end or angle of the main frame 1 is supported by the tractor drive and steering assembly indicated generally by the number 26 in Figs. 1 and 2, and shown in detail in Fig. 8.

The implement receives power for performing its several functions from an internal combustion engine 27 of usual construction mounted on the main frame 1 and receiving fuel from a reservoir 28 shown only in Fig. 1. The engine is cooled by water circulated through the cylinder jackets and radiator 29 shown in Figs. 1 and 2. Power for propelling the implement is transmitted from one end of the engine shaft 66 to the tractor driving means 26 through the transmission assembly indicated by the number 30 in Fig. 2 and shown in detail in Figs. 6 and 7. Power for steering the implement is taken from the opposite end of the engine shaft and transmitted to the propelling and steering means 26 through the steering gear assembly 31 indicated generally in Figs. 1 and 2, and shown in deail in Figs. 9, 10, and 11. Power for driving the cutter bar or other driven part of the implement is transmitted to the implement drive shaft 32 through the power drive and adjusting assembly 33 shown in outline in Figs. 1 and 2 and in detail in Figs. 12 to 17. Power for driving the implement elevating or adjusting shaft 34 is transmitted through the same assembly, the shafts 32 and 34 being controlled by separate clutch mechanism to be described later.

Referring again to Figs. 1 and 2, 35 indicates a supplemental frame pivotally connected at 36 to brackets carried on opposite sides of the main frame. The front end of this frame is adapted for attachment to and adjustably supports the implement used in the combination. In the drawings we have illustrated a mower having two cutter bars 37, 38, operatively connected to the diagonally disposed carrying pipe 39 which is detachably supported on the supplemental frame by means of the lifting arms 40, 41.

Figure 3:
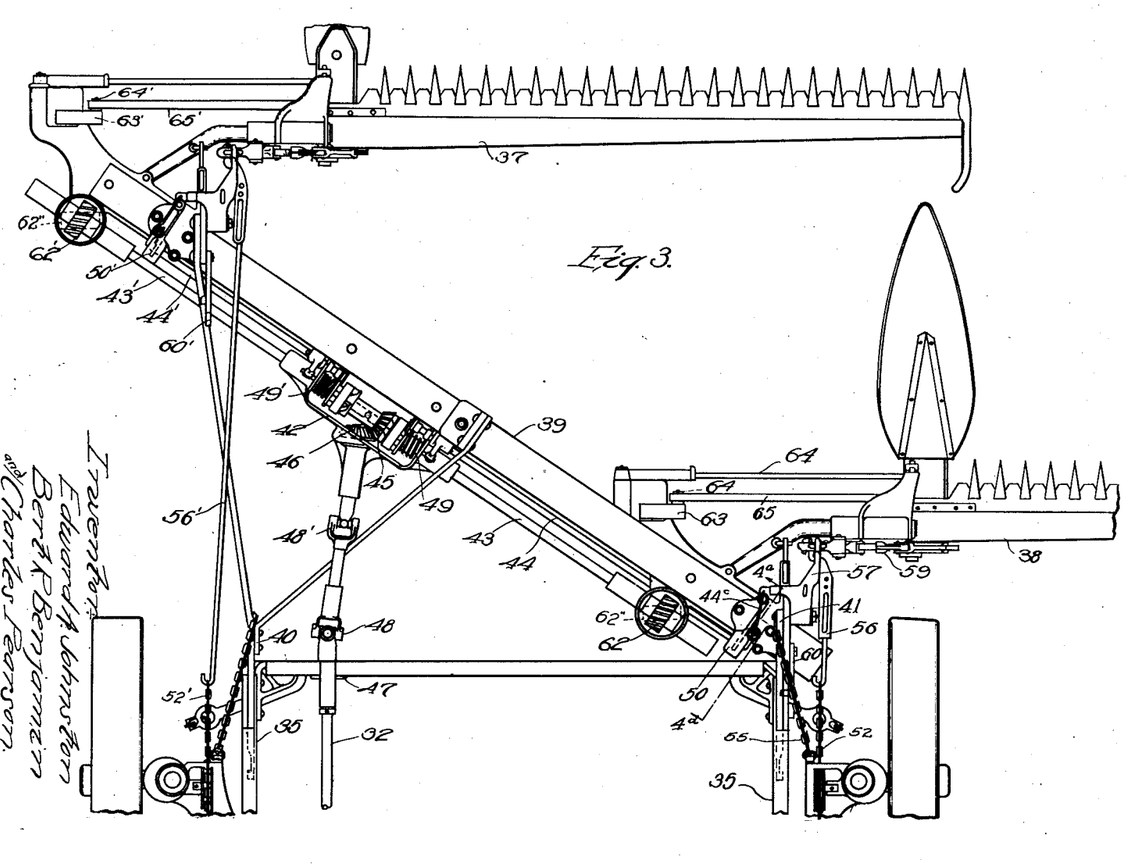
Fig. 3 is an enlarged view of the implement carrying means shown diagrammatically in Fig. 2.

Referring to Fig. 3, the carrying pipe or implement frame 39 has mounted thereon the gear and clutch case 42 and extending in opposite directions from this case parallel to the carrying pipe are the countershafts 43, 43' and the rock shafts 44, 44'. Within the case is mounted the bevel gear 45 having one member of a clutch formed on each end and driven by a bevel gear 46 mounted on the implement drive shaft 32. The drive shaft is secured in a bearing on the supplemental frame at 47 and is provided with the universal couplings 48, 48' to permit relative movement of the supplemental frame and carrying pipe. The counter-shafts 43, 43' are provided on their ends adjacent the gear 45 with clutch members, which are urged by the springs 49, 49' into engagement with the adjacent clutch elements on the gear. The opposite ends of the shafts are supported in bearings on the carrying pipe and are provided with spiral gears 62 and 62' meshing with corresponding spiral gears 62'' on the shafts carrying the crank disks 63, 63'. Each crank disk has a wrist pin 64, 64' to which are connected the pitmen 65, 65' to drive the cutter bars in the usual manner. The ends of the rock shafts 44, 44' within the gear case are provided with collars engaging the clutch elements on the counter shafts. The rock shafts are mounted for both rocking and longitudinal movement and when the mower cutter bars are raised, the shafts are rocked and through the cam surface 44ª on the lifting lever brackets 50, 50' are moved longitudinally to disengage the clutches as is usual in mowers to prevent breaking of the pitman.

It will be noted in Figs. 3 and 4ª that the shaft 44 is rockably supported in the bracket 50 fastened to the pipe 39. The end of the shaft 44 is bent at a right angle and supports a roller 44ᵇ, the end of the bent portion being coupled to the lifting lever 57 by means of a pusher rod 44ᶜ. Obviously, then, when the lever 57 is moved upwardly to raise the cutter bar 38 the pusher rod 44ᶜ will rock the shaft 44 rearwardly and the roller will ride over the cam portion 44ª to force the shaft 44 outwardly, thereby disengaging the clutch elements at the opposite end of the shaft against the tension of the spring 49. Of course, it is to be understood that the shaft 44' is controlled by a similar mechanism.

Referring to Figs. 2, 3, 4, and 5, the adjusting shaft 34 is journaled in bearings carried by the main frame 1 and is provided at its opposite ends with the drums 51, 51' to each of which is secured one end of a chain or cable 52, 52' passing over pulleys 54, 54' carried on the front end of the main frame and adjustably secured at their other ends to the brackets 53, 53' on the supplemental frame. These chains provide a means for tilting the mower cutter bars and a means for raising and lowering the supplemental frame carrying the pipe and implement for vertical adjustment as will now be described.

Only the mechanism cooperating with the chain 52 at that end of the carrying pipe adjacent the cutter bar 38 will be described, the mechanism cooperating with chain 52' at the other end being substantially identical with the exception of the length of one element. In Fig. 4 the frame and cutter bar are shown in lowered position for normal operation of the mower. In this position the chain 52 is slack, and the support chain 55 secured at one end to the main frame and at the other end to the lifting arm 41 prevents further lowering of the supplemental frame and cutter bar. An adjustable pull rod 56 is connected at one end to the chain 52 intermediate its end and the pulley 54 and is pivotally connected at its other end to one arm of a lifting lever 57 pivoted to the lifting arm 41. Pivoted to the other arm of the lifting lever is a link 58 which is connected at its lower end to the usual link connections 59 for tilting the cutter bar. A pawl 60 pivoted to the lifting arm 41 is adapted to engage a lug 60 on the lifting lever 57 as shown in dotted lines in Fig. 5 to hold the cutter bar in vertical position for a purpose to be described later. The connections at the other end of the carrying pipe for the cutter bar 37 are of the same construction except that the pull rod 56' is longer than the corresponding rod 56.

Figures 5, 11, 13:
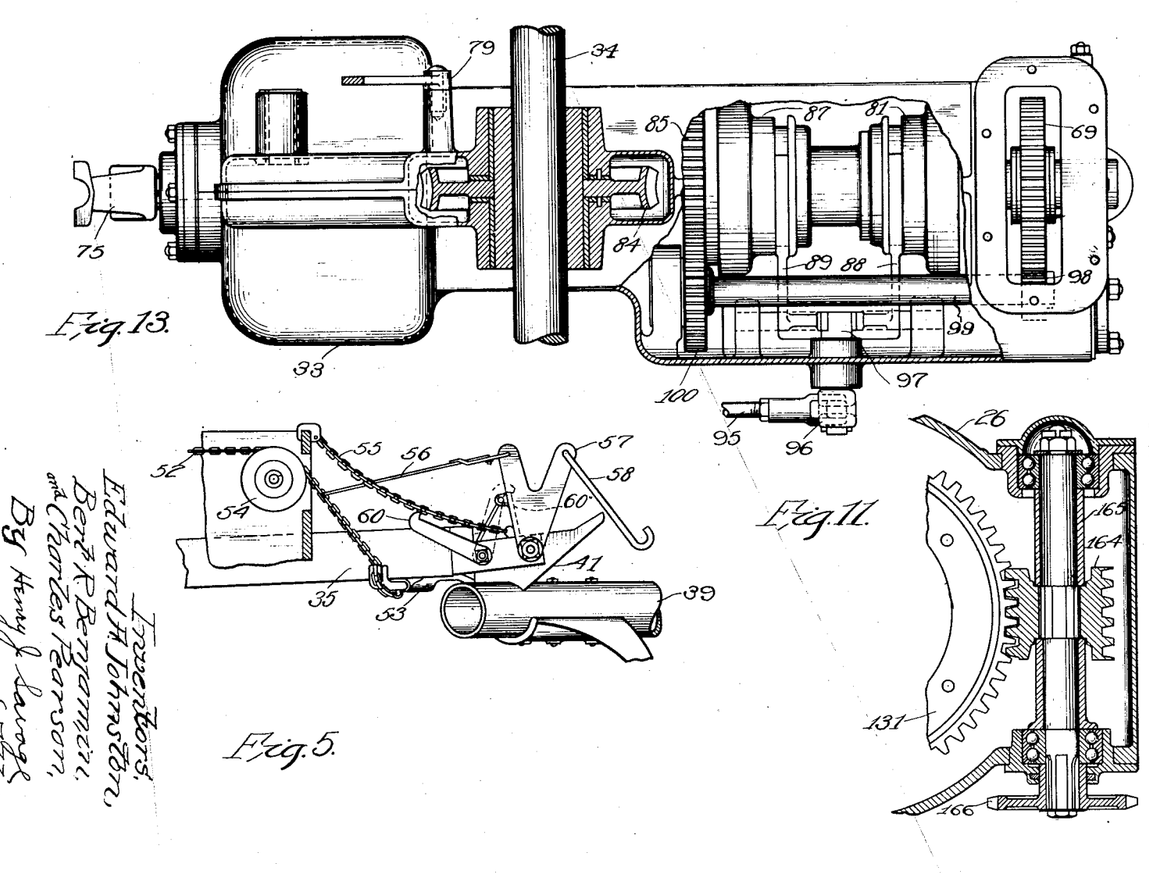
Fig. 5 is a similar view showing the adjusting means in elevating position.
Fig. 11 is a sectional view of a part of the steering mechanism taken on the line 11—11 Fig. 8, looking in the direction of the arrows.
Fig. 13 is another view of the power transmission and lifting means for the implement.

Assume the parts to be in the position shown in Figs. 3 and 4 with both mowers in operation and that the operator wishes to tilt the cutter bars to inoperative position or to raise them slightly to avoid an obstruction. He will shift the clutch lever 61 (Figs. 1 and 2) to drive the adjusting shaft 34 to wind the cables or chains 52, 52' on the drums 51, 51'. As the chain is wound on the drums, there will be an almost direct pull exerted on the pull rod 56 and an indirect or slight pull exerted on the front end of the supplemental frame 35 due to the angle formed in the chains as will be apparent from an inspection of Fig. 4. The first effect of this pull on the chain is to rock the lifting lever 57 from full line to dotted line position, (Fig. 4), thereby tilting the cutter bar to nearly vertical position and only slightly raising the supplemental frame and diagonal pipe. It is of course understood that while this operation is taking place with respect to cutter bar 38, the bar 37 is being tilted in the same manner through the chain 52' and its connecting rods and levers. When the parts occupy the dotted line position shown in Fig. 4, continued pull on the chain will continue tilting the cutter bar and more rapidly lift the supplemental frame and vertically raise the diagonal pipe 39 and both mowers. This combined movement continues until the position shown in Fig. 5 is reached at which time the cutter bars are substantially vertical and the frame and carrying pipe in elevated position. If it is desired to only partly raise the cutter bars or frame, as when it is desired to avoid an obstruction in the field, the clutch controlled by lever 61 may be disengaged at any time during the operation and the parts will be held at that point. The lever 61 will then be shifted to reverse position to effect the reverse or lowering operation. If it is desired to use but one mower, one of the pawls or latches 60 or 60' is manually moved to engage the lug on the corresponding lifting lever 57, 57' when the cutter bar is in vertical position. The bar is then held in inoperative position as the supplemental frame and remaining bar are lowered. It is thus seen that either mower may be used independently of the other.

*Implement driving and lifting mechanism.*

Figure 17:
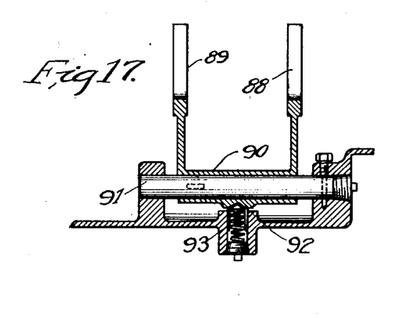
Fig. 17 is a detail of the clutch shifting arm.

Attention is now invited to Figs. 12 and 17 in which the mechanism for driving the implement driving shaft 32 and the lifting shaft 34 is shown in detail. One end of the engine crank shaft is indicated at 66 in Fig. 12 and carries a bevel pinion meshing with a bevel gear keyed to the shaft 67 journaled in an extension of the crank case, The shaft 67 carries a spur gear 67' at its outer end meshing with two gears 68 and 69, the gear 68 forming one member of the power steering clutch mechanism to be described later. The gear 69 is carried by a stub shaft 70 and meshes with the gear 71 keyed to the clutch shaft 72 journaled in the casing 33. The end of the shaft 72 opposite the gear 71 carries one element of a multiple disc clutch 73, the other clutch element being carried by a shaft 74 provided with one part of a universal coupling 75 for driving connection with the implement drive shaft 32. It will be noted in Figs. 1 and 2 that the universal coupling 75 is in alignment with the pivotal connection 36 of the supplemental frame to the main frame, thus permitting the shaft 32 to be raised and lowered with the supplemental frame without being strained or distorted. The clutch 73 is controlled by a cam lever 76 having a fork at one end engaging over a pin on the clutch sleeve 74' (Fig. 12) and being provided with a cam surface 77 at its opposite end for engagement by a roller 78 carried by the clutch operating lever 79. The lever 79 is integral with the angular roller carrying extension, the angular bight being pivoted at 79' by means of a suitable bolt carried by the casing 33. Forward movement of the lever 79 by the operator will cause the roller 78 to depress the cam 77 of the lever 76 forcing the clutch sleeve to the left in Fig. 12 against the tension of the clutch springs to disengage the clutch. Shifting the lever 79 to the rear in Fig. 1 or to the right in Fig. 12 will release the lever 76 and permit the clutch springs to engage the clutch disc as is usual in the art. It is thus seen that the single lever 79 conveniently placed to the operator enables him to have complete control of the driving mechanism of the implement at all times.

The shaft 72 has keyed near one end adjacent the gear 71 one element 80 of a multiple disc clutch, the other member 81 of which is secured to one end of a sleeve 82 carried by ball bearings on the shaft 72, the opposite end of the sleeve having a splined connection with a worm 83 meshing with the worm wheel 84 keyed to the adjusting shaft 34. A gear 85 rotatably mounted on the sleeve 82 has rigidly secured thereto one member 86 of a second multiple disc clutch, the other clutch member 87 being rigidly secured to the sleeve 82. The clutch members 81 and 87 are provided with grooves adapted to receive the forked ends 88, 89 of a clutch shifting arm 90 splined to the shaft 91 mounted in bosses formed integral with the casing 33. The arm 90 is provided with a conical depression 92 adapted to be engaged by a spring pressed detent 93 to yieldingly hold the arm in neutral position in which position both clutch members 81, 87 are disengaged from their respective cooperating members 80, 86. The arm 90 is shifted on the shaft 91 to engage the desired clutch elements 80, 81 or 86, 87 to drive the shaft 34 to raise or lower the supplemental frame 35 and the implement carried thereby by the lever 61 previously referred to. The lever 61 is pivoted on a bracket 94 secured to the main frame of the tractor (Fig. 1) and is connected at its lower end to one end of a link or rod 95 which is connected at its opposite end to a crank or arm 96 keyed to an operating arm 97 journaled in the casing 33 and operatively engaging the clutch shifting arm 90, as best shown in Fig. 13.

The clutch gear 85 and the clutch member 80 keyed to the shaft 72 are rotated in opposite directions by the gearing shown in Figs. 13, 14, 15, and 16. The gear 69 meshes with a gear 98 keyed to a short shaft 99 rotatably mounted in bearings in the casing 33 and having a gear 100 keyed to its opposite end and meshing with the clutch gear 85. It is thus apparent that the adjusting shaft 34 can be driven in opposite directions depending on which of the two clutches is engaged, or will remain in any adjusted position when the clutch shifting arm 90 is in neutral position.

*Power transmission assembly.*

Figures 6, 6A:
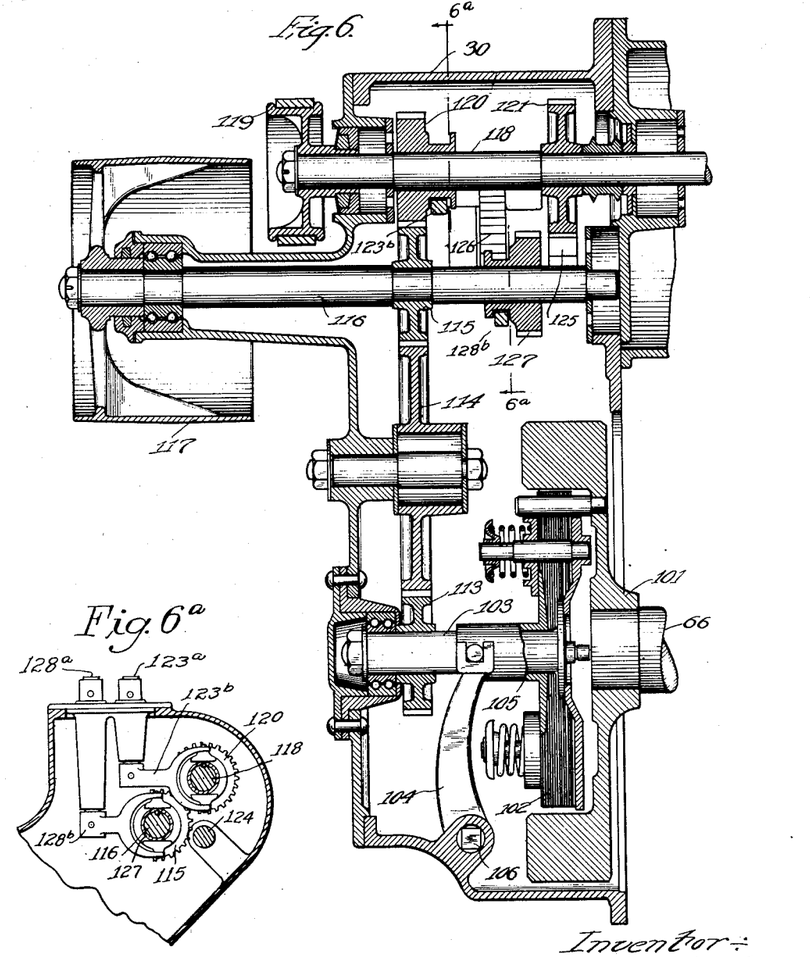

Figs. 6 and 7 are detail views of the power transmission assembly indicated generally by the number 30 in Fig. 2. Referring particularly to Fig. 6, 66 indicates the engine crank shaft, the opposite end of which is shown in Fig. 12. The flywheel 101 keyed to the crank shaft forms one member of a multiple disc clutch 102, the other member being secured to the shaft 103 journaled in the casing 30. The main or power propelling clutch 102 is controlled by a forked arm 104 engaging a sleeve 105 in the usual manner. The arm 104 is keyed or otherwise secured to the lower end of a short vertical shaft 106 journaled in the transmission housing and carrying at its upper end the clutch operating cam 107, Fig. 2. A lever 108 carrying a cam operating roller 109 is pivoted at one end to the casing 30 so that the roller will engage and operate the cam 107 on operation of the main clutch lever 110 mounted on the main frame convenient to the operator's seat 111, the levers 110 and 108 being joined by a rod or link 112. When the lever 110 is in its forward position as shown in Figs. 1 and 2, the lever 108 is rocked forward, the roller 109 having engaged and partly rotated the cam 107 and its connected arm 104 counter-clockwise (Figs. 2 and 6). This movement of the arm shifts the sleeve 105 to the left (Fig. 6) against the tension of the clutch springs to release the clutch. When the main clutch lever 110 is shifted to the rear, the lever 108 is rocked clockwise (Fig. 2) to release the cam 107 to permit the clutch springs to engage the clutch discs.

The shaft 103 has keyed thereto the gear 113 meshing with an idler 114 rotatably mounted on a stub shaft secured in one wall of the casing 30. The idler gear 114 meshes with a gear 115 keyed to the power shaft 116 journaled in the casing and carrying at its outer end a belt pulley 117 adapting the tractor for use as a power plant.

Parallel with the power shaft 116 is a tractor drive shaft 118 carrying on its outer end a brake drum 119 and extending at its outer end through the transmission casing 30 into the tractor drive and steering assembly housing 26 (Fig. 8). The shaft 118 carries within the transmission casing a gear 120 splined thereto and a gear 121 keyed thereon. The gear 120 is adapted to be shifted by the lever 122 and link 123 (Figs. 1 and 2) into or out of engagement with the gear 115 for high speed drive of the tractor, the transmission providing for two speeds forward and one reverse as will now be described.

A fixed shaft 124 (Fig. 7) mounted in the casing has rotatably mounted thereon two gears 125 and 126 integrally formed or rigidly secured together, the gear 125 being in mesh with the gear 121. A gear 127 splined to the power shaft 116 is adapted to be shifted by the lever 122, link 128, shaft 128ª and conventional shipper fork 128ᵇ (Figs. 1, 2 and 6ª) into engagement with the gear 121 for low speed drive of the tractor or into mesh with the gear 126 for reverse drive. The lever 122 also controls link 123, shaft 123ª and fork 123ᵇ to shift gear 120. A single lever 122 is employed for shifting the gears 120 and 127, it being necessary to move one of the gears into neutral position before the other can be engaged with its cooperating gear as is usual in the art.

The brake drum 119 referred to above has associated therewith a brake band operatively connected to the rod 112 of the clutch operating mechanism by means of a link 112ª fastened at one end to the lever 108 and at the other to one end of the brake band. When the lever 110 is in its forward position and the clutch disengaged, the brake band will be tightened on the drum 119 to quickly stop the tractor.

*Tractor driving mechanism.*

Referring to Fig. 8, the tractor driving and steering housing 26 is secured to or formed integral with a vertically disposed casing 129 secured to the tractor frame. Journaled within the vertical casing is the tubular steering post 130 having secured at its upper end the segmental worm wheel 131 and provided at its lower end with the flanges 132, 132' to which are secured by rivets or otherwise the vertical side plates 133, 133'. These side plates form a supporting frame for the rear end of the tractor and transmit the driving thrust of the traction tread to the main tractor frame. The side plates are provided with three alined pairs of bearings in which are journaled the shafts 134, 135, and 136 (Fig. 1). The rear shaft 136 is provided midway between its ends with a driving sprocket adapted to engage and drive the overlapping plates 137 forming the traction tread, or endless track drive of the tractor. The shaft 135 has mounted thereon a pair of idlers or supporting rollers for the track as best shown in Fig. 8. The forward shaft 134 carries a centrally disposed idler sprocket adapted to engage the track and adjustable forwardly and rearwardly by means of the adjusting screws 138 (Fig. 1) to maintain the proper tension in the track. There are two of the adjusting screws 138, one on each side plate 133, 133'. To the plate 133 is secured a gear casing 139 into the lower end of which projects one end of the drive sprocket shaft 136. A gear (not shown in the drawings but housed within the casing at 140) is keyed to this end of the shaft 136 and meshes with an idler 141 journaled on a roller bearing on the supporting shaft 142. The idler is driven by a pinion 143 secured to one end of a shaft 144 mounted in bearings supported between the flanges 132, 132' of the steering column. The opposite end of the shaft 144 carries a bevel gear 145 meshing with a bevel pinion 146 on the lower end of a vertical drive shaft 147 journaled within and concentric with the steering column. The upper end of the vertical drive shaft has keyed thereto a bevel gear 148 meshing with a bevel pinion 149 on the horizontal drive shaft 118. The shaft 118 is journaled at one end in a bearing 150 carried by the steering sector 131 and is provided with two universal couplings 151 for a purpose to be described later.

From the above description it is apparent that power is transmitted from the engine 27 to the traction tread members 137 to drive the tractor through the mechanism specifically disclosed in Figs. 6, 7, and 8, and that the tractor has two speeds forward and one reverse. It is also apparent that when the transmission gears 120–127 are in neutral position, the shaft 116 carrying the belt pulley 117 will be driven and the tractor may then be used as a power plant to operate belt driven machines of various kinds.

*Power steering mechanism.*

Figures 9, 10:
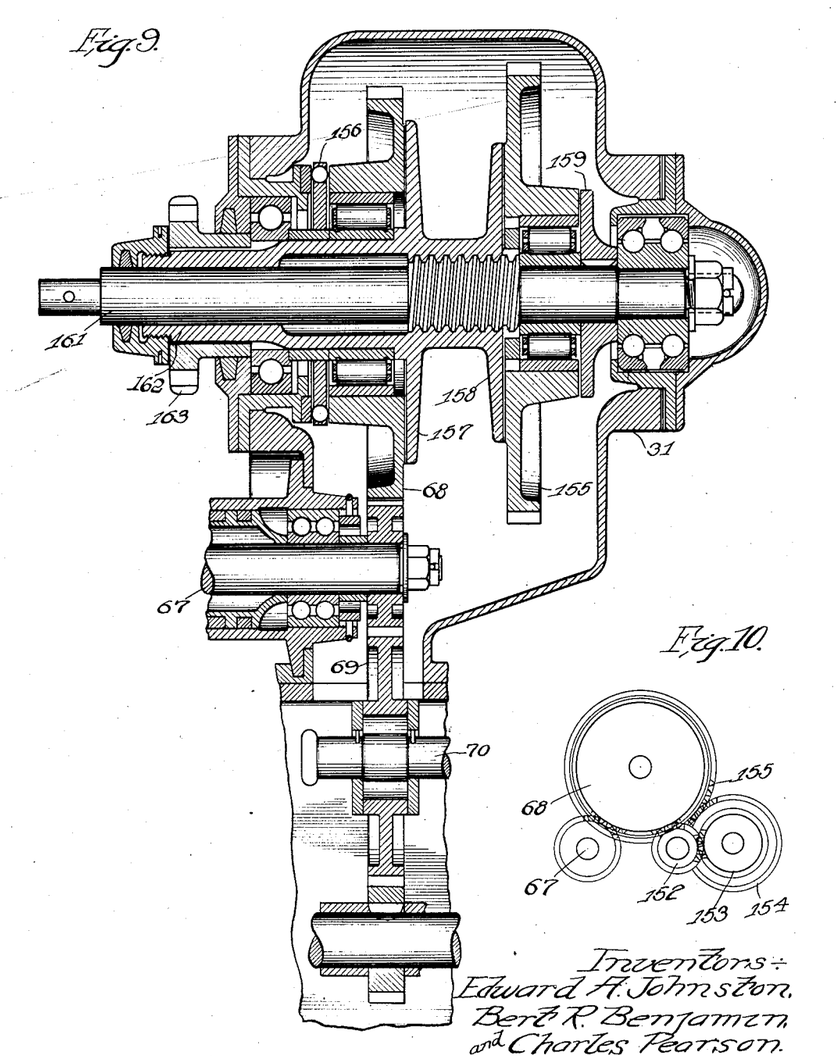
Fig. 9 is a sectional view of the steering gear, the section being taken on a substantially vertical plane indicated by the line 9—9, Fig. 2, looking in the direction of the arrows.
Fig. 10 is a diagrammatic view showing the arrangement of gears for driving the clutch gears of Fig. 9 in opposite directions.
Figure 14:
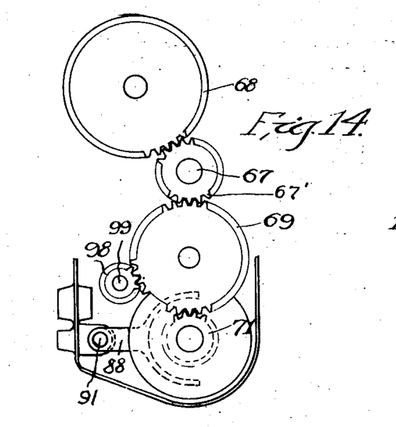
Fig. 14 is a view looking from right to left as indicated by the arrows 14—14 of Fig. 12 showing the arrangement of the gears.
Figures 15, 16:
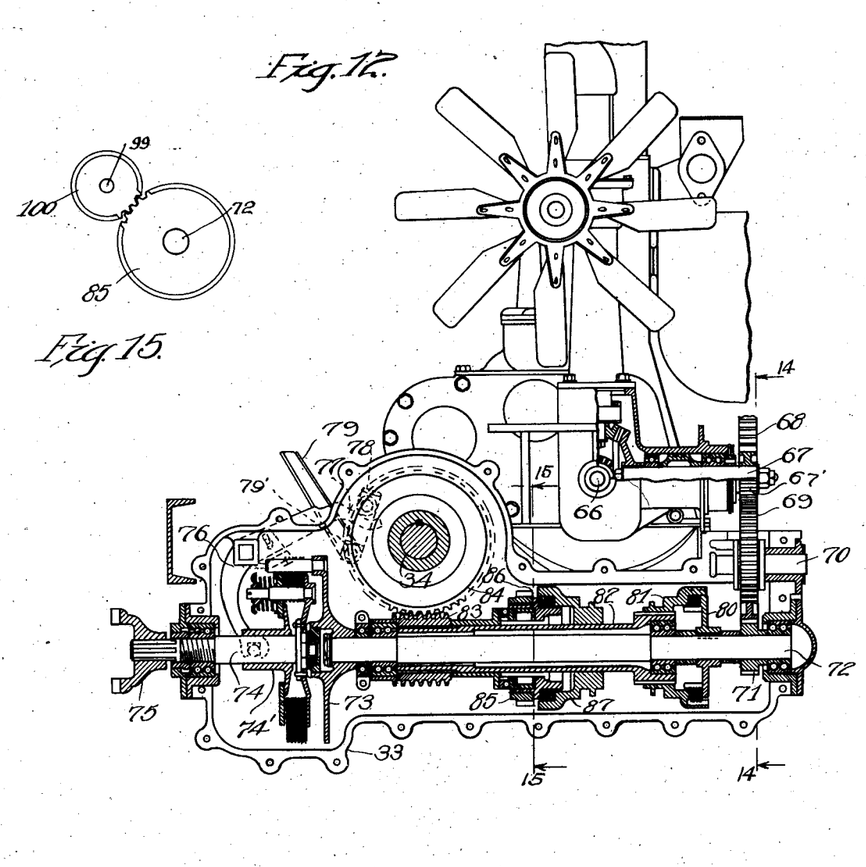
Figs. 15 and 16 show the gears for driving the two clutch gears of Fig. 12 in opposite directions, Figure 15 being taken substantially on the line 15—15 of Figure 12.
Figure 16:
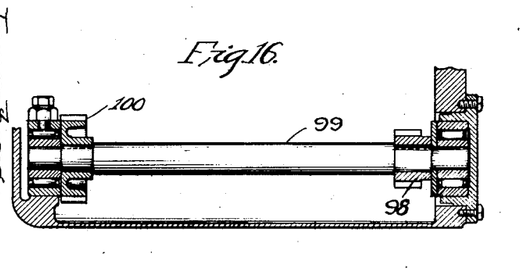

Attention is now invited to the power steering mechanism and particularly to Figs. 9, 10, and 11. In Fig. 9, the clutch gear 68 is shown driven from the shaft 67 as described in the above description of the power driving and adjusting mechanism. The clutch gear 68 through the intermediate gears 152, 153 and 154 (shown diagrammatically in Fig. 10) drives the clutch gear 155 in a direction opposite to the direction of rotation of the clutch member 68. The clutch member or gear 68 is mounted on a roller bearing within the steering gear housing 31 and at one side engages a thrust bearing 156 and at its opposite side is adapted to be engaged by one disc 157 of a two-way disc clutch, the other clutch disc 158 being adapted to engage a clutch face on one side of the gear 155, the opposite side of gear 155 engaging a thrust collar 159 keyed to the clutch operating shaft 161. The discs 157 and 158 are formed integral with a sleeve 162 having threaded engagement with the shaft 161 and having a sprocket 163 secured thereto at the end opposite the clutch discs. Referring to Fig. 11, the steering segment 131 has meshing therewith a worm 164 carried by the shaft 165 journaled in the casing 26. The shaft 165 projects at one end beyond the casing and carries a sprocket 166 driven by a chain 167 (Fig. 2) from the sprocket 163 (Fig. 9). The clutch operating shaft 161 is connected by a universal coupling 168 to the steering shaft 169 (Figs. 1 and 2) which has keyed near its forward end a sprocket 170 cooperating with the chain 22 and hand wheel 21 described in connection with the manual steering means.

Assuming now that the tractor is in motion propelling an implement and the operator wishes to turn to the left. The hand wheel 21 will be rotated to the left (or counter-clockwise) which through the chain 22, sprocket 170 and shaft 169 will rotate clutch shaft 161 in the same direction. Owing to the screw threaded engagement of the shaft 161 with the clutch sleeve 162, the disc 158 will be shifted to the right (Fig. 9) into engagement with the clutch face of gear 155, which is continuously rotated from the shaft 67 and intermediate gears in left hand direction or counter-clockwise, when viewed from the right in Fig. 9. Engagement of the clutch members 158 and 155 rotates the sleeve 162 and its sprocket 163 in the same direction that the shaft 161 and handwheel are turned, thus driving the sprocket 166 and worm 164. The inclination of the worm is such that left hand rotation of hand wheel 21 rotates the steering worm wheel 131 to angle the traction device to the right. The rear end of the tractor will then travel to the right about the front supporting wheels to effect a left turning movement of the tractor. It is thus seen that a left hand rotation of the steering wheel causes engagement of the clutch members 158 and 155 to effect a left-hand turn of the tractor and conversely a right-hand rotation of the hand wheel will cause engagement of the clutch members 157 and 68 to cause a right-hand turn of the tractor.

It will be noted from Fig. 9 that whichever way the shaft 161 is rotated the corresponding clutch disc 157 or 158 will engage the clutch gear 68 or 155 rotating in the same direction. This will tend to release the clutch as soon as it is engaged by rotating the sleeve on the screw threaded shaft. In order to keep the clutch in driving engagement it is therefore necessary for the operator to continue to rotate the hand wheel 21 until the tractor driving means has been angled sufficiently to make a turn of the desired radius. If a short turn is desired, as when the tractor is driving a cultivator and has reached the end of a row and it is necessary to make a turn of 180° to enter the tractor between adjacent rows, the hand wheel 21 will be rotated and the clutch members kept in engagement until the tractor drive is angled through approximately 45° at which time the locking pin 15 previously described will be raised to release the yoke 14. This releases the steering mechanism for the front wheels 8 and 9, permitting them to be angled to effect a very short quick turn of the tractor. In practice it has been found that our power-driven implement can turn within substantially its own length through cooperation of the two steering means.

When the steering sector 131 is turned by the worm 164 it carries with it the tractor driven shaft 118, steering post 130, vertical drive shaft 147, and all of the tractor driving mechanism supported by the frame 133, 133'. The universal coupling 151 and bearing 150 are provided to make possible this turning movement. It will be understood of course that the tractor is being driven by power transmitted through shaft 118, and gears 149, 148 when the steering mechanism is in operation. When the vertical shaft 147 and gear 148 are angled in the steering operation of the tractor, there would be relative rotation or planetary movement between the gears 148 and 149 except for the universal couplings in shaft 118. These couplings permit the shaft to swing with the steering sector without changing the relative speeds of the shafts 118 and 147. Except for this construction, the steering mechanism would be forced to angle the tractor against the power of the engine when turning in one direction which would throw a heavy overload on the clutches 157 and 158. If the bearing 150 were carried by the casing 26 and the shaft 118 were continuous, then the shaft 147 and tractor tread 137 would either be speeded up or retarded whenever the tractor was turned.

While we have shown and described but a single embodiment of our invention, it is to be understood that we do not desire to be limited thereto but that the invention may be embodied in various modifications, and we desire to include as our invention all such modifications as fall within the scope of the subjoined claims. For example, the mower illustrated with two cutter bars may be replaced by a mower having a greater or less number of bars, or by a header, corn harvester or other implement.

What we claim as our invention is:

1. In a motor propelled implement, the combination of a frame, traction means for propelling the frame, an implement adjustably connected thereto, a power unit carried by the frame, and mechanism operatively connected to the power unit for propelling and steering traction means and for driving and adjusting the implement.

2. In a power driven implement, the combination of a frame, traction means for propelling the frame, an implement adjustably connected thereto, a power unit mounted on the frame, mechanism adapted to be driven from the power unit for propelling and steering the traction means and adjusting and driving the implement, and means for controlling said mechanism within reach of the operator of the tractor.

3. In a motor propelled implement, the combination of a tractor having a frame, an implement adjustably connected to the frame and having a cutter bar, a power unit carried by the frame, and mechanism operatively connected to the power unit for propelling the tractor, steering the tractor, driving the implement, adjusting the implement and tilting the cutter bar.

4. In a motor propelled implement the combination of a tractor having a frame, an implement adjustably connected to the frame and having a cutter bar, a power unit carried by the frame, mechanism operatively connected to the power unit for propelling the tractor, steering the tractor, driving the implement, adjusting the implement and tilting the cutter bar, and independent control means for said mechanism within reach of the operator of the tractor.

5. In a power driven implement the combination of a tractor having a main frame, a power unit carried thereby, an adjustable supplemental frame carried by the main frame, an implement operatively connected to the supplemental frame, mechanism driven from the power unit for propelling and steering the tractor, driving the implement, and adjusting the supplemental frame, and control means for said mechanism within reach of the operator of the tractor.

6. A power driven implement comprising in combination a tractor having a main frame and power unit, an adjustable supplemental frame connected to the main frame, an implement detachably connected to the suplemental frame, means driven from the power unit for propelling and steering the tractor and for adjusting the supplemental frame and implement, and independent control means for the propelling, steering and adjusting means.

7. A power driven implement comprising a main frame, propelling and carrying means supporting the frame, a power unit mounted on the frame, an implement adjustably connected to and supported by the frame, connections between the power unit and propelling means for driving and angling the latter to propel and steer the implement, connections between the power unit and implement for driving and adjusting the latter, and independent control means for the connections within reach of the operator of the implement.

8. A power driven implement comprising a main frame, propelling and carrying means supporting the frame, a power unit mounted on the frame, an implement having a plurality of cutter bars adjustably connected to the frame, driving connections between the power unit and propelling means, driving connections between the power unit and cutter bars, mechanism driven from the power unit for adjusting the implement and independent control means for the driving connections and adjusting mechanism.

9. A power driven implement comprising a main frame, propelling and carrying means supporting the frame, a power unit mounted on the frame, an implement having a plurality of cutter bars adjustably connected to the frame, driving connections between the power unit and propelling means, driving connections between the power unit and cutter bars, mechanism driven from the power unit for tilting said cutter bars and adjusting the implement, the cutter bars being tilted in advance of the implements being adjusted, and independent control means for the driving connections and adjusting mechanism.

10. A power driven implement comprising a main frame, propelling and carrying means supporting the frame, a power unit mounted on the frame for driving the propelling means, a supplemental frame adjustably connected to the main frame, an implement having a plurality of cutter bars detachably connected to the supplemental frame, driving connections between the power unit and cutter bars, and connections from the power unit for adjusting the supplemental frame and raising or lowering the cutter bars.

11. A power driven implement comprising a main frame, propelling and carrying means supporting the frame, a power unit mounted on the frame for driving the propelling means, a supplemental frame adjustably connected to the main frame, an implement having a plurality of cutter bars detachably connected to the supplemental frame, driving connections between the power unit and cutter bars, connections from the power unit for adjusting the supplemental frame and raising or lowering the cutter bars, and means for locking either of said bars in raised position.

12. In a power propelled implement the combination of a tractor having a frame, a power unit mounted on the frame, an implement adjustably connected to the frame and having a cutter bar, an adjusting shaft rotatably mounted on the frame, mechanism connecting the power unit and shaft adapted to drive the latter in either direction, means connecting the shaft and implement for adjusting the implement and raising or lowering the cutter bar when the shaft is rotated.

13. In a power propelled implement the combination of a tractor having a main frame, a power unit mounted thereon, a supplemental frame pivotally connected to the main frame, an implement frame connected to the supplemental frame and having a plurality of cutter bars, means for driving the cutter bars from the power unit and means for adjusting the supplemental frame and raising or lowering the cutter bars comprising a shaft journaled on the main frame and adapted to be driven from the power unit.

14. In a power propelled implement the combination of a tractor having a main frame, a power unit mounted thereon, a supplemental frame pivotally connected to the main frame, an implement frame connected to the supplemental frame and having a plurality of cutter bars, means for driving the cutter bars from the power unit, means for adjusting the supplemental frame and raising or lowering the cutter bars comprising a shaft journaled on the main frame and adapted to be driven from the power unit, and means for locking either of the cutter bars in raised position.

15. A power driven implement comprising in combination a main frame, a power unit mounted thereon, a supplemental frame adjustably connected to the main frame, an implement frame detachably carried by the supplemental frame and supporting a cutter bar, driving connections carried by the supplemental and implement frames for driving the cutter bar from the power unit, clutch mechanism for controlling the driving connections, and means driven from the power unit for adjusting the supplemental frame and cutter bar.

16. A power driven implement comprising in combination a main frame, an engine mounted thereon for propelling and steering the implement, an implement frame adjustably connected to the main frame and diagonally disposed with respect to the line of travel, a plurality of cutter bars operatively connected to the diagonal frame and disposed in offset relation, driving connections between the engine and cutter bars, and means driven from the engine for adjusting the implement frame and raising or lowering the cutter bars.

17. A power driven implement comprising in combination a main frame, a supplemental frame adjustably connected thereto, an implement frame carried by the supplemental frame and diagonally disposed with respect to the line of travel, a plurality of cutter bars operatively connected to the implement frame and disposed in offset relation, driving means for said cutter bars carried by the implement frame, and a drive shaft carried by the supplemental frame adapted to drive said driving means.

18. In a power driven implement the combination of a main frame, a supplemental frame adjustably connected thereto, power driven means for adjusting the supplemental frame, an implement frame carried by the supplemental frame and having a cutter bar operatively connected thereto, driving means for the cutter bar carried by the implement frame, and a power driven shaft carried by the supplemental frame adapted to drive said driving means.

19. In a power driven implement the combination of a main frame, a supplemental frame adjustably connected thereto, a plurality of cutter bars disposed in offset relation detachably connected to the supplemental frame, independent driving means for said cutter bars, means for raising and lowering said cutter bars, a drive shaft for said driving means, and means controlled by the positions of the cutter bars adapted to connect the driving means and drive shaft.

20. In a power driven implement the combination of a main frame, a supplemental frame adjustably connected thereto, a plurality of cutter bars disposed in offset relation detachably connected to the supplemental frame, means for raising and lowering the cutter bars, independent driving means for said cutter bars, a drive shaft adapted to be connected to said driving means, and clutch mechanism controlled by the positions of the cutter bars for connecting and disconnecting the drive shaft and driving means.

21. In a power driven implement the combination of a main frame, a supplemental frame adjustably connected thereto, a plurality of cutter bars disposed in offset relation detachably connected to the supplemental frame, means for raising and lowering the cutter bars, independent driving means for said cutter bars, a drive shaft adapted to be connected to said driving means, and clutch mechanism adapted to connect the respective driving means with the drive shaft when the respective cutter bars are lowered and disconnect the same when the cutter bars are raised.

22. In a power driven implement the combination of a main frame, a supplemental frame adjustably connected thereto, a plurality of cutter bars disposed in offset relation detachably connected to the supplemental frame, means for raising and lowering the cutter bars, independent driving means for said cutter bars, a drive shaft adapted to be connected to said driving means, clutch mechanism adapted to connect the respective driving means with the drive shaft when the respective cutter bars are lowered and disconnect the same when the cutter bars are raised, and independent means for locking the cutter bars in raised position.

23. In a power driven implement the combination of a main frame, a supplemental frame adjustably connected thereto, a plurality of cutter bars disposed in offset relation detachably connected to the supplemental frame, power driven means for raising and lowering the cutter bars and adjusting the supplemental frame, independent driving means for said cutter bars, a power driven shaft adapted to drive said driving means, and means controlled by the positions of the cutter bars for connecting and disconnecting the respective driving means and drive shaft.

24. In a power driven implement the combination of an adjustable frame, an implement frame connected thereto and diagonally disposed with respect to the line of travel, a cutter bar operatively connected to the implement frame, a counter shaft carried by the implement frame adapted to drive the cutter bar, a drive shaft carried by the supplemental frame adapted to be connected to the counter shaft, means for adjusting the frame and for raising and lowering the cutter bar, and means dependent on the position of the cutter bar for connecting and disconnecting the counter-shaft and drive shaft.

25. In a power driven implement, a frame, an implement frame detachably connected thereto, a plurality of cutter bars operatively connected to the implement frame, a plurality of counter shafts carried by the implement frame for driving the cutter bars, means for raising and lowering the cutter bars, a power shaft, clutch controlled means adapted to connect the power shaft and counter shafts, and means connected with each cutter bar for controlling the clutch means whereby the counter shafts will be connected to the drive shaft when the respective cutter bars are lowered and disconnected when the cutter bars are raised.

26. In a power driven implement, a frame, an implement frame detachably connected thereto, a plurality of cutter bars operatively connected to the implement frame a plurality of counter shafts carried by the implement frame for driving the cutter bars, means for raising and lowering the cutter bars, a power shaft, clutch controlled means adapted to connect the power shaft and counter shafts, means connected with each cutter bar for controlling the clutch means whereby the counter shafts will be connected to the drive shaft when the respective cutter bars are lowered and disconnected when the cutter bars are raised, and independent means for locking the respective cutter bars in raised position.

27. A power driven implement comprising a main frame, a power driven shaft journalled thereon, a supplemental frame pivotally connected to the main frame, a plurality of cutter bars carried by the supplemental frame and adapted to be tilted, and means controlled by rotation of the shaft for raising and lowering the supplemental frame and tilting the cutter bars.

28. A power driven implement comprising a main frame, a power driven shaft journalled thereon, mechanism for rotating said shaft in either direction, a second frame pivotally connected to the main frame, a cutter bar supported by the second frame and adapted to pivot about one end, means connecting the shaft with the second frame and cutter bar whereby the frame and the cutter bar will be raised when the shaft is rotated in one direction and lowered when the shaft is rotated in the opposite direction.

29. A power driven implement comprising a main frame, a power driven shaft journalled thereon, a second frame adjustably connected to the main frame, a plurality of cutter bars supported by the second frame and adapted to pivot about one end, means connecting the shaft with the second frame and cutter bars whereby the second frame will be elevated and the cutter bars tilted upward on rotation of the shaft in one direction and the frame lowered and the cutter bars tilted downward on rotation of the shaft in the opposite direction, and mechanism for rotating the shaft in either direction, said mechanism being adapted to hold the frame and cutter bars in any adjusted position.

30. Implement driving and lifting mechanism comprising a power-driven shaft, a drive shaft for the implement, clutch mechanism adapted to connect the power-driven shaft and drive shaft, a lifting shaft, a clutch sleeve rotatably mounted on the power driven shaft, driving connections between the clutch sleeve and lifting shaft, and clutch mechanism cooperating with the power driven shaft and clutch sleeve whereby the latter and the lifting shaft may be rotated in either direction.

In testimony whereof we affix our signatures.

EDWARD A. JOHNSTON.
BERT R. BENJAMIN.
CHARLES PEARSON.